May 2, 1933.    B. W. A. DICKSON    1,906,451
GUN MOUNTING FOR USE ON AIRCRAFT AND OTHER VEHICLES
Filed Oct. 10, 1931    3 Sheets-Sheet 1
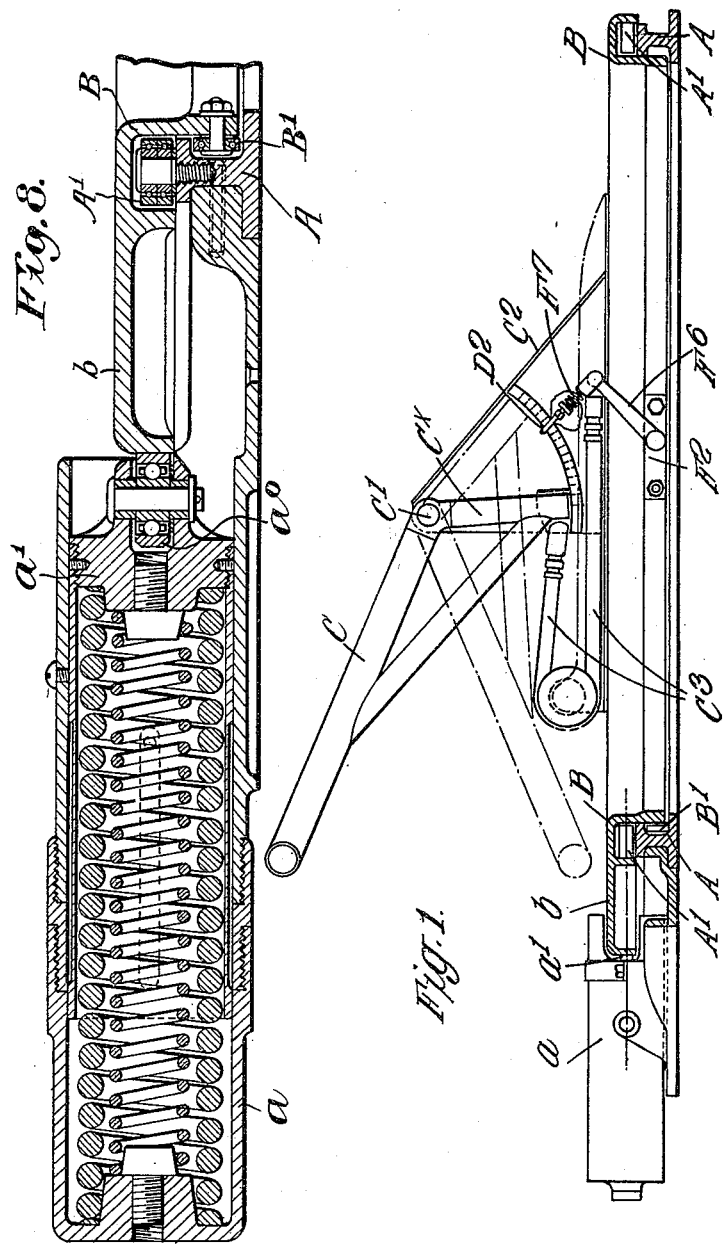

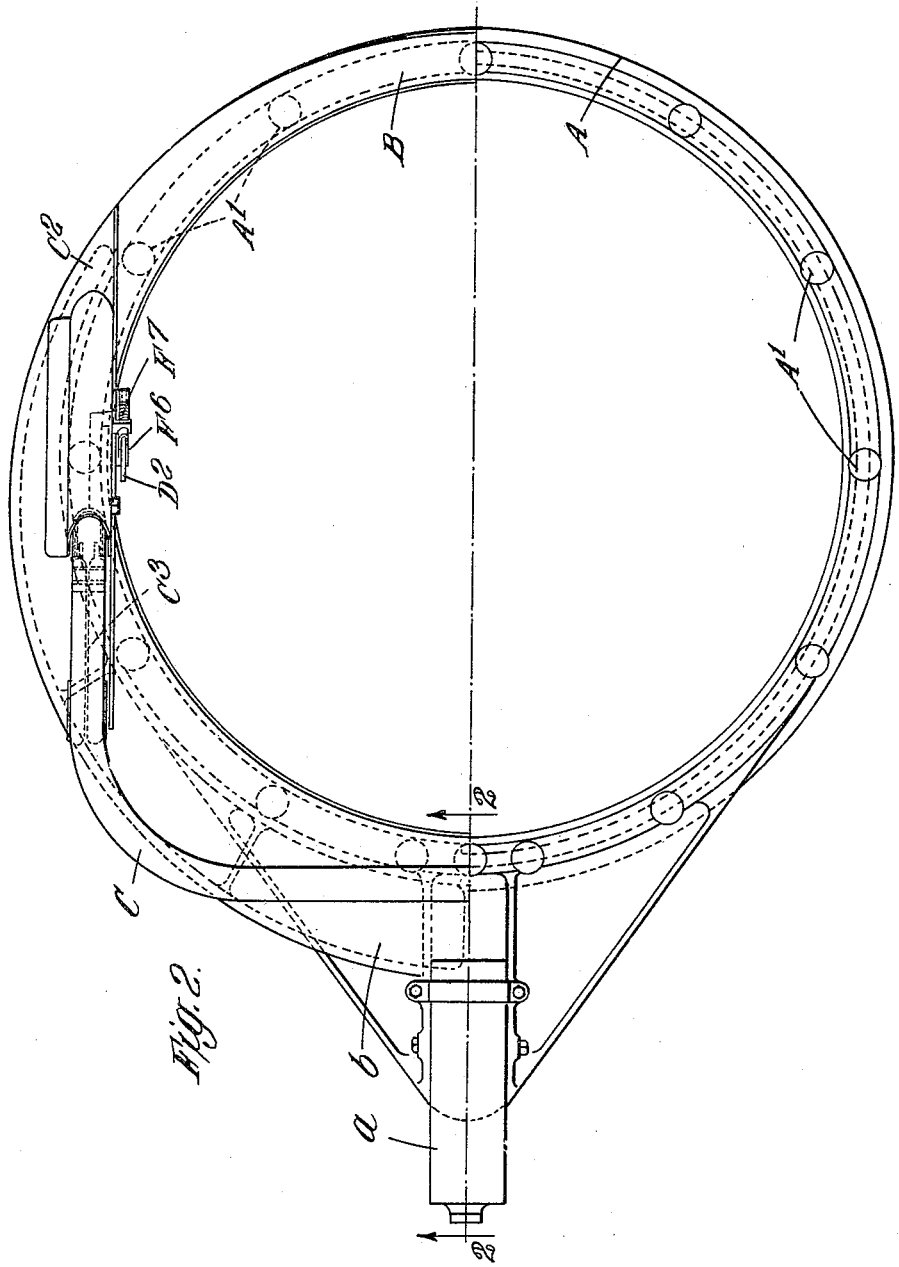

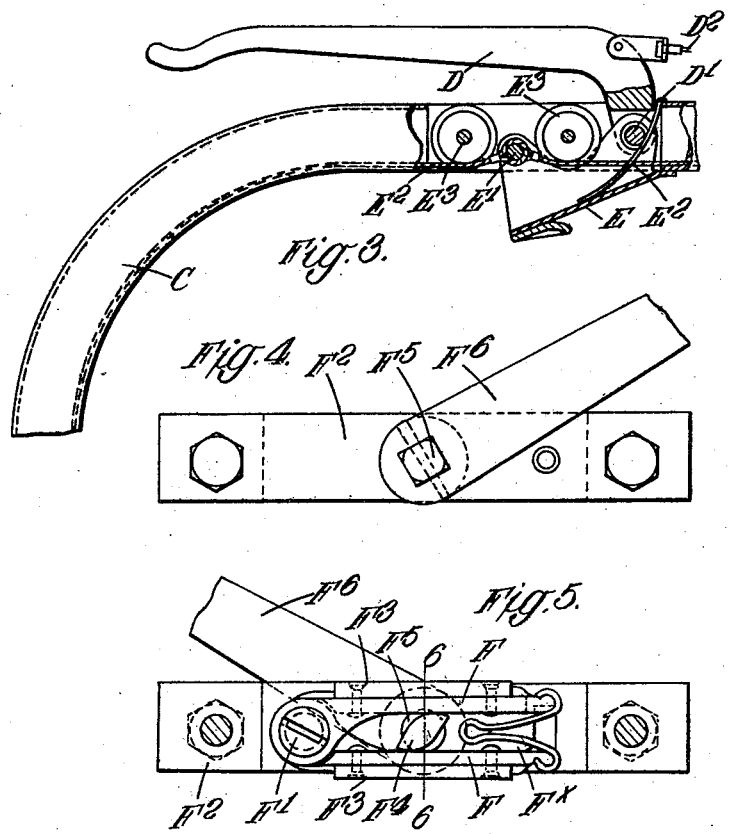
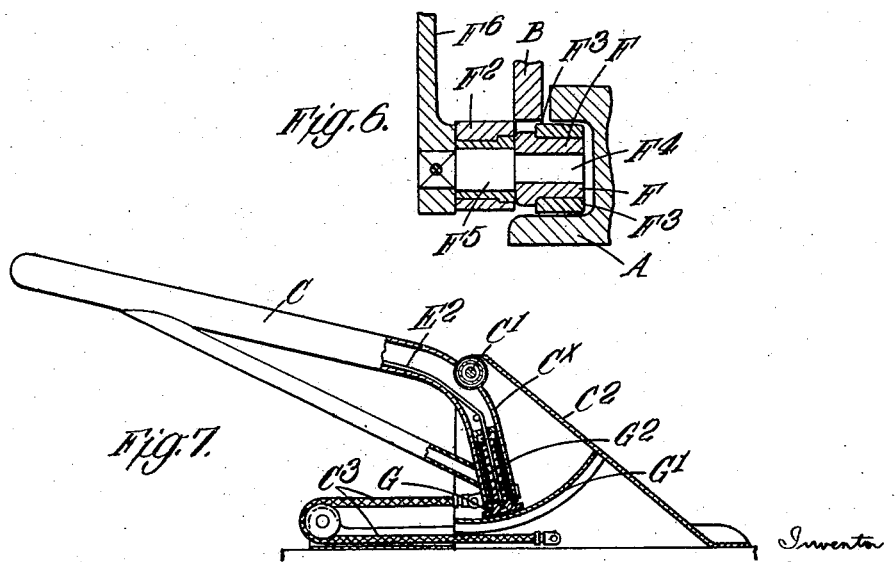

Patented May 2, 1933

1,906,451

UNITED STATES PATENT OFFICE

BONNER WILLIAM ARTHUR DICKSON, OF LITTLE BRIDGEN, BEXLEY, ENGLAND, ASSIGNOR TO VICKERS-ARMSTRONGS LIMITED, OF WESTMINSTER, ENGLAND, A BRITISH COMPANY

GUN MOUNTING FOR USE ON AIRCRAFT AND OTHER VEHICLES

Application filed October 10, 1931, Serial No. 568,069, and in Great Britain October 22, 1930.

This invention relates to machine gun mountings for use on aircraft and other vehicles.

One feature of the present invention relates to a gun mounting comprising a fixed ring and a rotatable ring arranged eccentrically with respect to each other, one or more springs being provided which act upon the rotatable ring in such a manner as to cause a rotating couple which neutralizes the effect of the wind pressure on the gun carried by the rotatable ring. In existing mountings of this kind the two rings are mounted in horizontal planes parallel to each other but some distance apart vertically with the result that the thrust of the balancing spring or springs and the re-action to such thrust cause a twisting moment proportional to the distance separating the two planes, this twisting moment tending to cause distortion.

According to this feature of the present invention, I so construct and arrange the mounting that the thrust of the spring or springs and the re-action to the thrust take place in the same plane so that the aforesaid twisting moment is avoided.

The invention also relates to an improvement in the means for operating training and elevating retaining devices which normally hold the rotatable ring and an elevating arm (carrying the gun) in any position to which they have been adjusted. In existing mountings this is accomplished by means of a single lever which releases the training retaining device to enable the rotatable ring to be rotated for training the gun and also releases the elevating retaining device to enable the elevating arm to be moved for raising or lowering the gun. These two actions have taken place either simultaneously or consecutively, as may be pre-arranged, upon operation of the lever but it is subsequently impossible to alter the sequence of these operations. The object of this portion of the present invention is to permit these two operations to be carried out separately and independently and in any desired sequence, or simultaneously, as may be required by the gunner. This object is accomplished according to this feature of the invention by providing a separate control member for each retaining device in such a manner that one hand can be used to operate either or both of the retaining devices.

The invention further relates to an improved construction of the training retaining device for holding the rotatable ring in its adjusted position on the fixed ring. This device, according to this feature of the present invention, consists of a frictional member or members carried by the rotatable ring and held in engagement with the fixed ring by means of a spring in such a manner that the resultant friction is sufficient to prevent movement of the rotatable ring relative to the fixed ring under all working conditions. When however it is desired to rotate the rotatable ring the pressure of the spring upon the frictional member is relieved by means of a control member, thus leaving the rotatable ring free to be rotated as desired by the gunner. When during rotation the control member is released, the frictional member is pressed into contact with the fixed ring and the rotatable ring comes to rest gradually and without shock such as is occasioned by the usual direct mechanical locking device.

The invention furthermore relates to an improved construction of the elevating retaining device for holding the elevating arm in its adjusted position relative to the rotatable ring on which it is mounted. According to this feature of the present invention this retaining device comprises two frictional brake members one of which is carried by the rotatable ring and the other, which is spring-controlled, is carried by the elevating arm and is arranged to be moved out of contact with the other member, when required, by means of a control member. When this control member is released the spring presses the second-mentioned frictional brake member into contact with the other brake member with sufficient force to hold the elevating arm in its adjusted position.

In order that the said invention may be clearly understood and readily carried into effect, the same will now be described more fully with reference to the accompanying drawings, in which:—

Figure 1 is a sectional side elevation of a gun mounting provided with my improvements, Figure 2 is a plan of Figure 1, the rotatable ring having been removed from the lower part, Figure 3 is a local view of the elevating arm showing the control members for the aforesaid retaining devices, Figure 4 is a side elevation of the training retaining device removed from the rotatable ring, Figure 5 is a view in the opposite direction to that of Figure 4, of the training retaining device, Figure 6 is a section on the line 6, 6 of Figure 5, Figure 7 is a sectional side elevation showing the elevating retaining device, and Figure 8 is a vertical section on line 2—2 of Fig. 2.

A is the fixed ring of the mounting, this ring being of girder shape as shown in Figure 1, and B is the rotatable ring which is channelled or made of inverted U shape as shown in Figure 1 and carries a flange $b$ the periphery of which is eccentric with respect to the axis of the ring A which represents the training axis of the ring B. The ring A carries, at suitable intervals, horizontal rollers A′ which rotate about vertical axes and are disposed in the channel in the ring B as shown and the latter ring carries vertical rollers B′ which rotate about horizontal axes and are disposed in the inner channel of the ring A as shown. The periphery of the eccentric flange $b$ bears against a roller $a^0$ on a spring controlled plunger $a'$ contained in a casing $a$ connected to the fixed ring A. The spring-controlled plunger, the rotatable ring and the fixed ring are arranged in approximately the same plane and it will be seen that the axis of the plunger lies in a horizontal plane passing through the middle portions of the rollers A′ as indicated by the dotted line at the left hand side of Figure 1 and therefore the thrust of the spring and the re-action of the parts to such thrust take place in the same plane. Instead of the single spring plunger shown, any other arrangement of spring or springs cooperating between the fixed ring A and the eccentric flange $b$ may be used; for example one or more springs acting through a system of levers may be provided. Furthermore the plunger may be controlled by a helical spring or by a leaf spring and may operate on the eccentric flange through the medium of friction reducing bearings.

The elevating arm C on which the gun is carried is trunnioned at C′ to brackets (one of which is shown at $C^2$) on each side of the rotatable ring B and the weight of the arm and gun is balanced by elastic cords $C^3$ at each side of the mounting. Arranged at a convenient position along the elevating arm are two control members D and E appertaining to the training retaining device and the elevating retaining device respectively. These members are in the form of levers arranged on opposite sides of the arm and pivoted upon the same pivot pin D′, the relative positions of these levers being such that the gunner can operate either of them separately or both of them simultaneously by one hand. The lever D is operated alone by grasping it and the part of the elevating arm in front of the lever E and the latter is operated alone by the thumb of the operator whilst holding the part of the elevating arm behind this lever; the said levers are operated simultaneously by grasping them both so as to move them towards each other. The lever D has attached to it a wire $D^2$ connected to the training retaining device which is preferably constructed as hereinafter described and the lever E has a projecting pin E′ to which the ends of wires $E^2$, $E^2$ are attached these wires passing over pulleys $E^3$, $E^3$ to each of the elevating retaining devices which are preferably constructed as hereinafter described.

The training retaining device comprises two arms F, F (Figures 5 and 6) which are pivoted to the inner end of a pin F′ carried by a plate $F^2$ attached to the rotatable ring B and which are provided on their outer surfaces with friction material $F^3$. The plates are situated in the inner channel of the fixed ring A as shown in Figure 6 so that the friction material thereon can engage with the upper and lower walls of this channel when the arms are forced apart. This is effected by means of a cam member $F^4$ carried by a pin $F^5$ to which is connected an arm $F^6$; the aforesaid wire $D^2$ is attached to this arm as shown in Figure 1 and a spring $F^7$ is provided for normally holding the arm in the position in which cam $F^4$ forces the arms F, F apart so as to bring the friction materials thereon into contact with the walls of the channel in the fixed ring A and hold the rotatable ring in its adjusted position on the fixed ring. When the arm $F^6$ is operated by a pull on the wire $D^2$ the cam $F^4$ is moved into the position shown in Figure 5 to enable a spring $F^x$ engaging with the free ends of the arms F, F to bring the friction materials out of contact with the walls of the channel in the ring A, thereby enabling the rotatable ring B to be trained freely.

The retaining devices for the elevating arm (of which there are two, one at each side of the mounting and of which one is shown in the drawings) each comprises a brake shoe C (Figure 7) which is carried by a depending part C$^x$ of the elevating arm C and which is adapted to engage with a brake segment C' arranged in the bracket C$^2$ concentrically with the trunnions C'. The shoe C is normally pressed into engagement with the segment C' by a spring C$^2$ and is moved out of engagement by pulling on the wire E$^2$. The relative positions of the shoe and segment may, if desired, be reversed. Alternatively a brake of the externally contracting type may be used, or a brake of the disc type may be provided one of the discs being attached to the arm C and the other to the bracket C$^2$ both concentrically with respect to the trunnion C'.

What I claim and desire to secure by Letters Patent of the United States is:—

1. A machine gun mounting for use on aircraft and other vehicles, of the kind comprising a fixed ring and a rotatable ring arranged eccentrically with respect to each other and having at least one spring which acts upon the rotatable ring in such a manner as to cause a rotating couple which neutralizes the effect of the wind pressure on the gun carried by the rotatable ring, wherein the parts are so constructed and arranged that the thrust of the spring on the rotatable ring and the re-action to the thrust take place in the same plane.

2. A machine gun mounting as in claim 1, wherein the spring or springs, the fixed ring and the rotatable ring are arranged in substantially the same horizontal plane.

3. A machine gun mounting, for use on air-craft and other vehicles, and including a rotatable ring mounted on a fixed ring and held in its adjusted position by means of a retaining device, the said retaining device comprising a frictional member or members carried by the rotatable ring and ordinarily held in engagement with the fixed ring by means of a spring, said frictional members of the retaining device comprising pivoted arms which carry friction material and are normally forced apart by means of a spring controlled cam.

4. A machine gun mounting as in claim 1, wherein the springs are carried by the fixed ring, and rollers are provided for taking the thrust of the said springs, said rollers being carried by the fixed ring in a position relative thereto such as to place their middle portions in the plane of the thrust resulting, the said rollers being located to bear against that part of the rotatable ring which is concentric with the fixed ring.

5. A machine gun mounting as in claim 1, in which the springs are carried by the fixed ring, and rollers are provided for taking the thrust thereof, and the rollers are carried by the fixed ring in a position such as to result in their middle portions being in the plane of the thrust, the said rollers being located to bear against a part of the rotatable ring concentric with the flexible ring, said rollers being disposed in a channel in the rotatable ring, said channel being concentric with the fixed ring.

BONNER WILLIAM ARTHUR DICKSON.